(12) United States Patent
Kobayashi et al.

(10) Patent No.: US 10,457,264 B2
(45) Date of Patent: Oct. 29, 2019

(54) ABNORMALITY DETECTION DEVICE

(71) Applicants: ADVICS CO., LTD., Kariya-shi, Aichi (JP); TOYOTA JIDOSHA KABUSHIKI KAISHA, Toyota-shi, Aichi (JP)

(72) Inventors: Tatsushi Kobayashi, Kariya (JP); Takahiro Okano, Chiryu (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 66 days.

(21) Appl. No.: 15/754,351

(22) PCT Filed: Aug. 25, 2016

(86) PCT No.: PCT/JP2016/074889
§ 371 (c)(1),
(2) Date: Feb. 22, 2018

(87) PCT Pub. No.: WO2017/038651
PCT Pub. Date: Mar. 9, 2017

(65) Prior Publication Data
US 2018/0244253 A1 Aug. 30, 2018

(30) Foreign Application Priority Data
Aug. 28, 2015 (JP) .................................. 2015-168772

(51) Int. Cl.
*G06F 7/70* (2006.01)
*B60T 17/22* (2006.01)
(Continued)

(52) U.S. Cl.
CPC ............ *B60T 17/221* (2013.01); *B60T 7/042* (2013.01); *B60T 8/00* (2013.01); *B60T 8/17* (2013.01);
(Continued)

(58) Field of Classification Search
CPC ........ B60T 17/221; B60T 8/172; B60T 8/171; B60T 8/885; B60T 13/662; B60T 13/146;
(Continued)

(56) References Cited

U.S. PATENT DOCUMENTS

2005/0236895 A1* 10/2005 Matsumoto ......... B60T 8/17557
303/140
2007/0090690 A1* 4/2007 Ohkubo ................ B60T 8/4081
303/122
(Continued)

FOREIGN PATENT DOCUMENTS

JP 2005-231462 A 9/2005
JP 2007-112293 A 5/2007
(Continued)

OTHER PUBLICATIONS

International Search Report (PCT/ISA/210) dated Nov. 22, 2016, by the Japanese Patent Office as the International Searching Authority for International Application No. PCT/JP2016/074889.
(Continued)

*Primary Examiner* — Shardul D Patel
(74) *Attorney, Agent, or Firm* — Buchanan Ingersoll & Rooney PC

(57) ABSTRACT

An abnormality detection device includes a control target hydraulic pressure calculating portion that calculates a control target hydraulic pressure according to an operation state of a brake pedal, the hydraulic pressure obtaining portion that obtains the hydraulic pressure of the operating fluid controlled to become the control target hydraulic pressure
(Continued)

calculated by the control target hydraulic pressure calculating portion from the pressure sensor; a second determination threshold value changing portion that changes a threshold value to be closer to the control target hydraulic pressure calculated by the control target hydraulic pressure calculating portion in a stepwise manner when a state determining portion determines that the control target hydraulic pressure is in a maintaining state, and the abnormality determining portion that determines the hydraulic pressure braking force generating device is abnormal when the hydraulic pressure obtained by the hydraulic pressure obtaining portion deviates from the permissible divergence range.

4 Claims, 6 Drawing Sheets

(51) Int. Cl.
*B60T 8/00* (2006.01)
*B60T 7/04* (2006.01)
*B60T 8/17* (2006.01)
*B60T 8/96* (2006.01)
*B60T 13/14* (2006.01)
*B60T 13/66* (2006.01)
*B60T 8/88* (2006.01)
*B60T 8/171* (2006.01)
*B60T 8/172* (2006.01)
*B60T 8/40* (2006.01)
*B60T 8/94* (2006.01)

(52) U.S. Cl.
CPC .............. *B60T 8/171* (2013.01); *B60T 8/172* (2013.01); *B60T 8/885* (2013.01); *B60T 8/96* (2013.01); *B60T 13/146* (2013.01); *B60T 13/662* (2013.01); *B60T 17/22* (2013.01); *B60T 8/4077* (2013.01); *B60T 8/94* (2013.01); *B60T 2220/04* (2013.01); *B60T 2270/40* (2013.01); *B60T 2270/413* (2013.01)

(58) Field of Classification Search
CPC ... B60T 8/96; B60T 8/17; B60T 7/042; B60T 8/00; B60T 17/22; B60T 2270/40; B60T 2220/04; B60T 2270/413; B60T 8/4077; B60T 8/94
USPC .............. 701/70, 78; 303/3, 10, 15, 20, 122; 903/947; 188/358
See application file for complete search history.

(56) References Cited

U.S. PATENT DOCUMENTS

| | | | | |
|---|---|---|---|---|
| 2010/0270854 | A1* | 10/2010 | Okano | B60T 1/10 303/3 |
| 2014/0346851 | A1* | 11/2014 | Sonoda | B60W 10/188 303/3 |
| 2015/0120161 | A1 | 4/2015 | Kamiya et al. | |
| 2015/0123456 | A1* | 5/2015 | Sato | B60T 8/267 303/3 |
| 2016/0167631 | A1* | 6/2016 | Miyazaki | B60T 7/042 701/70 |
| 2017/0015290 | A1* | 1/2017 | Oosawa | B60T 8/4081 |

FOREIGN PATENT DOCUMENTS

| | | |
|---|---|---|
| JP | 2011-189902 A | 9/2011 |
| JP | 2013-208987 A | 10/2013 |

OTHER PUBLICATIONS

Written Opinion (PCT/ISA/237) dated Nov. 22, 2016, by the Japanese Patent Office as the International Searching Authority for International Application No. PCT/JP2016/074889.

* cited by examiner

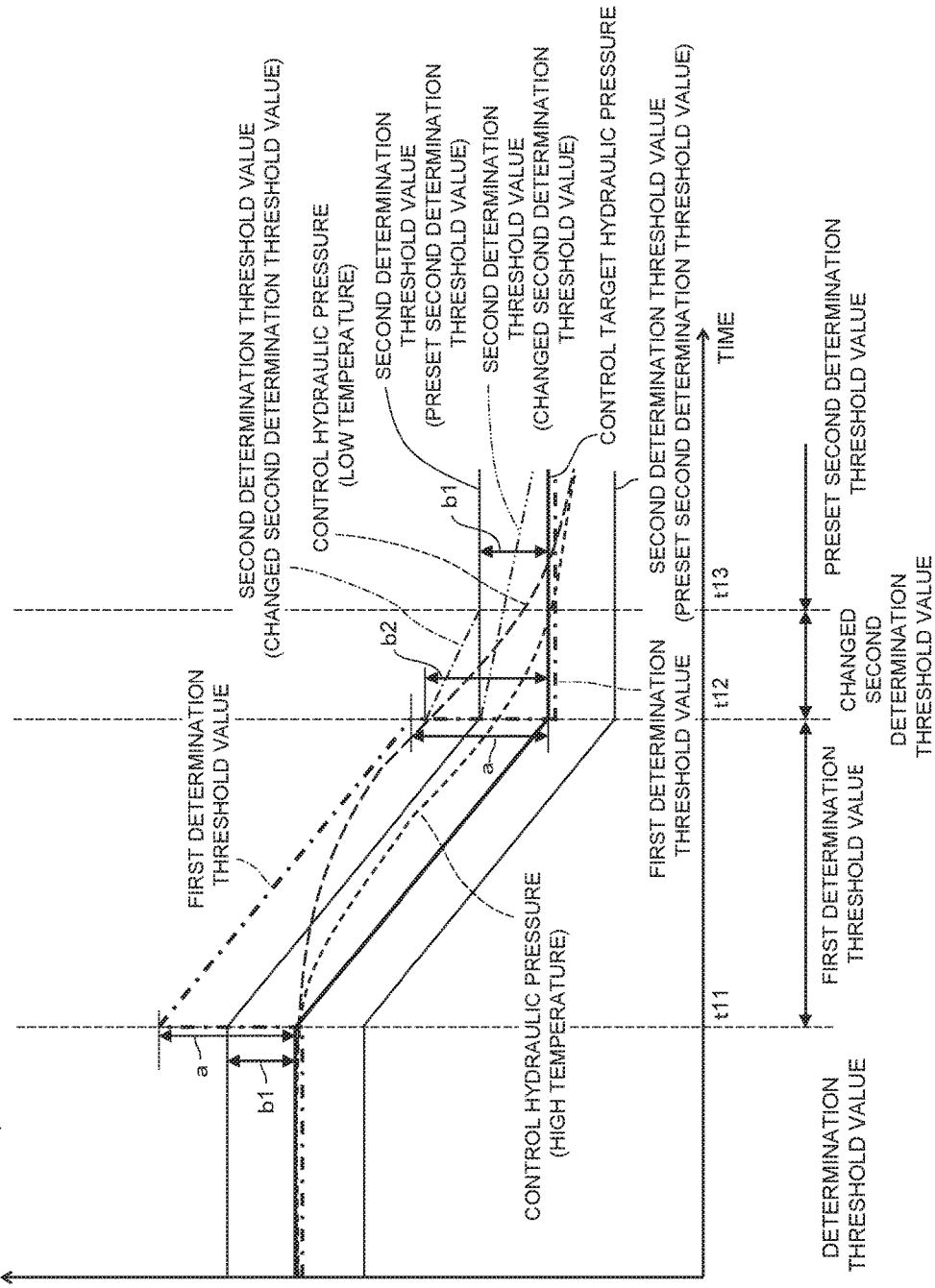

ABNORMALITY DETECTION DEVICE

TECHNICAL FIELD

The present invention relates to an abnormality detection device configured to detect abnormalities of a brake system.

BACKGROUND ART

A configuration disclosed in PTL 1 is known as one mode of a brake system. The brake system illustrated in FIG. 1 in PTL 1 is capable of detecting abnormalities of the brake system from a relationship between a control target hydraulic pressure determined by a pedal stroke of a brake pedal and an actually detected hydraulic pressure. For example, the abnormality detection device for detecting abnormalities of the brake system may be configured to set a determination area from the control target hydraulic pressure and detects an occurrence of abnormality when an actually detected hydraulic pressure is out of the determination area.

CITED REFERENCE

Patent Literature

PTL 1: JP-A-2005-231462

SUMMARY OF INVENTION

Technical Problem

When the control target hydraulic pressure is in a maintaining state in an abnormality detection device for detecting abnormalities of a brake system disclosed in PTL 1 described above, further adequate setting of a determination area and hence further accurate detection of abnormalities are required.

Accordingly, in order to solve the above-described problem, it is an object of the present invention to provide an abnormality detection device configured to detect abnormalities of a brake system further accurately.

Solution to Problem

In order to solve the above-described problem, an aspect of the invention of an abnormality detection device is an abnormality detection device configured to detect an abnormality of a brake system, including: a control target braking force related physical amount calculating portion configured to calculate a control target braking force related physical amount in accordance with an operation state of a brake operating member or a requirement from other system; a braking force related physical amount obtaining portion configured to obtain a braking force related physical amount of an operating fluid controlled to be a control target braking force related physical amount calculated by the control target braking force related physical amount calculating portion from a braking force related physical amount sensor; a state determining portion configured to perform a state determination for determining whether the control target braking force related physical amount is in a maintaining state of being maintained at a constant value, in an increasing state of being increased, or in a decreasing state of being decreased; a threshold value setting portion configured to set a threshold value that defines a permissible divergence range between the braking force related physical amount obtained by the braking force related physical amount obtaining portion and the control target braking force related physical amount calculated by the control target braking force related physical amount calculating portion; a threshold value changing portion configured to change the threshold value so as to be closer to the control target braking force related physical amount calculated by the control target braking force related physical amount calculating portion in a step-wise manner when the state determining portion determines that the control target braking force related physical amount is in the maintaining state; and an abnormality determining portion configured to determine the abnormality of the brake system when the braking force related physical amount obtained by the braking force related physical amount obtaining portion is deviated from the permissible divergence range.

Advantageous Effects of Invention

In this configuration, when the control target braking force related physical amount is determined to be in the maintaining state, the threshold value that defines the permissible divergence range for determining abnormalities of the brake system is changed to be closer to the control target braking force related physical amount in a stepwise manner. Consequently, the permissible divergence range can be set to an adequate value. Therefore, a reduction of time required for determination and improved adequacy of determination are achieved.

BRIEF DESCRIPTION OF DRAWINGS

FIG. 6 is a time chart illustrating an operation of the abnormality detection device according to an embodiment of the present invention (the control target hydraulic pressure is transferred from the decreasing state to the maintaining state).

EMBODIMENTS FOR IMPLEMENTING INVENTION

Figure 1:
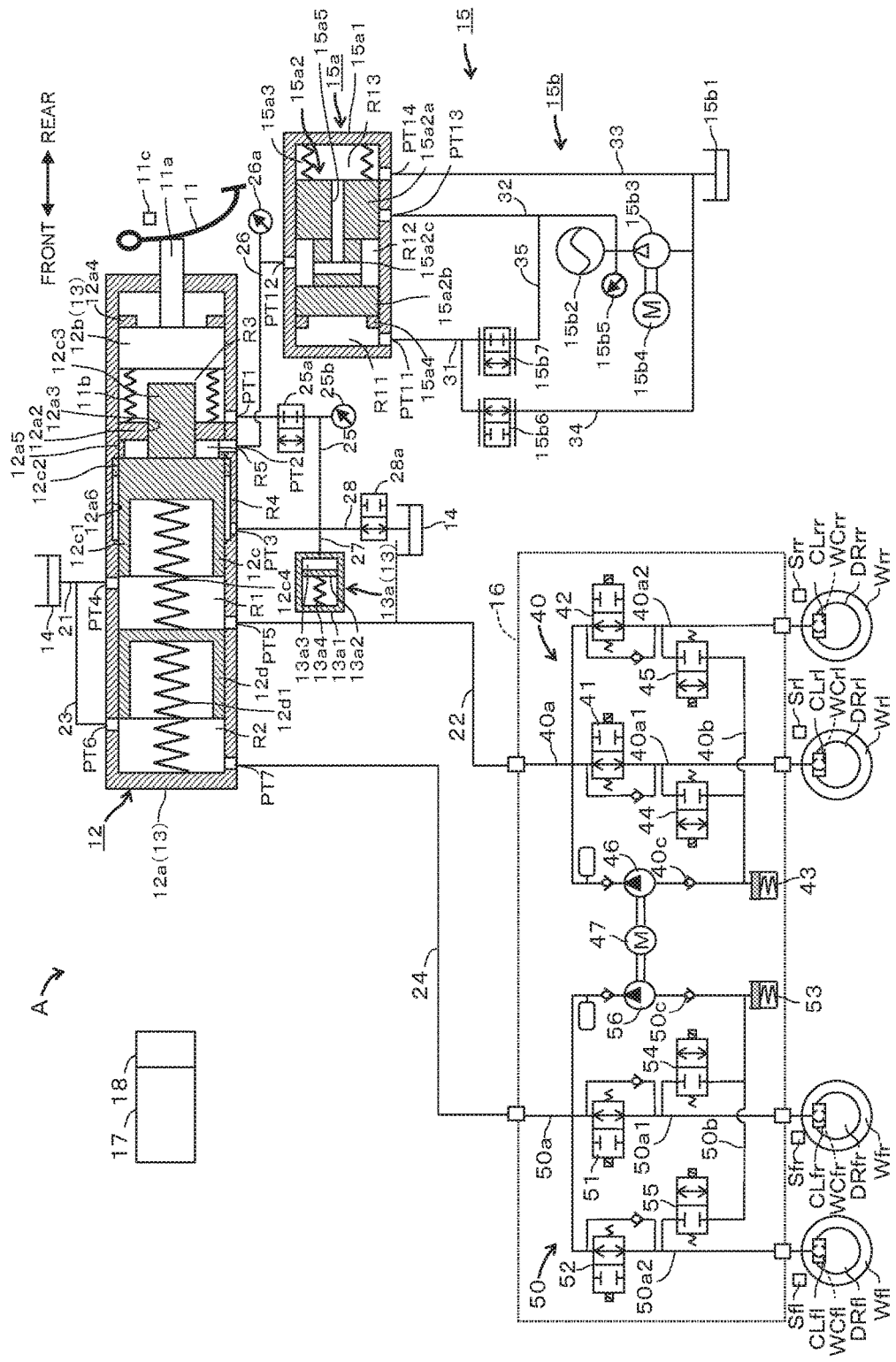
FIG. 1 is a schematic drawing illustrating an embodiment of an abnormality detection device according to the present invention.
Figure 2:
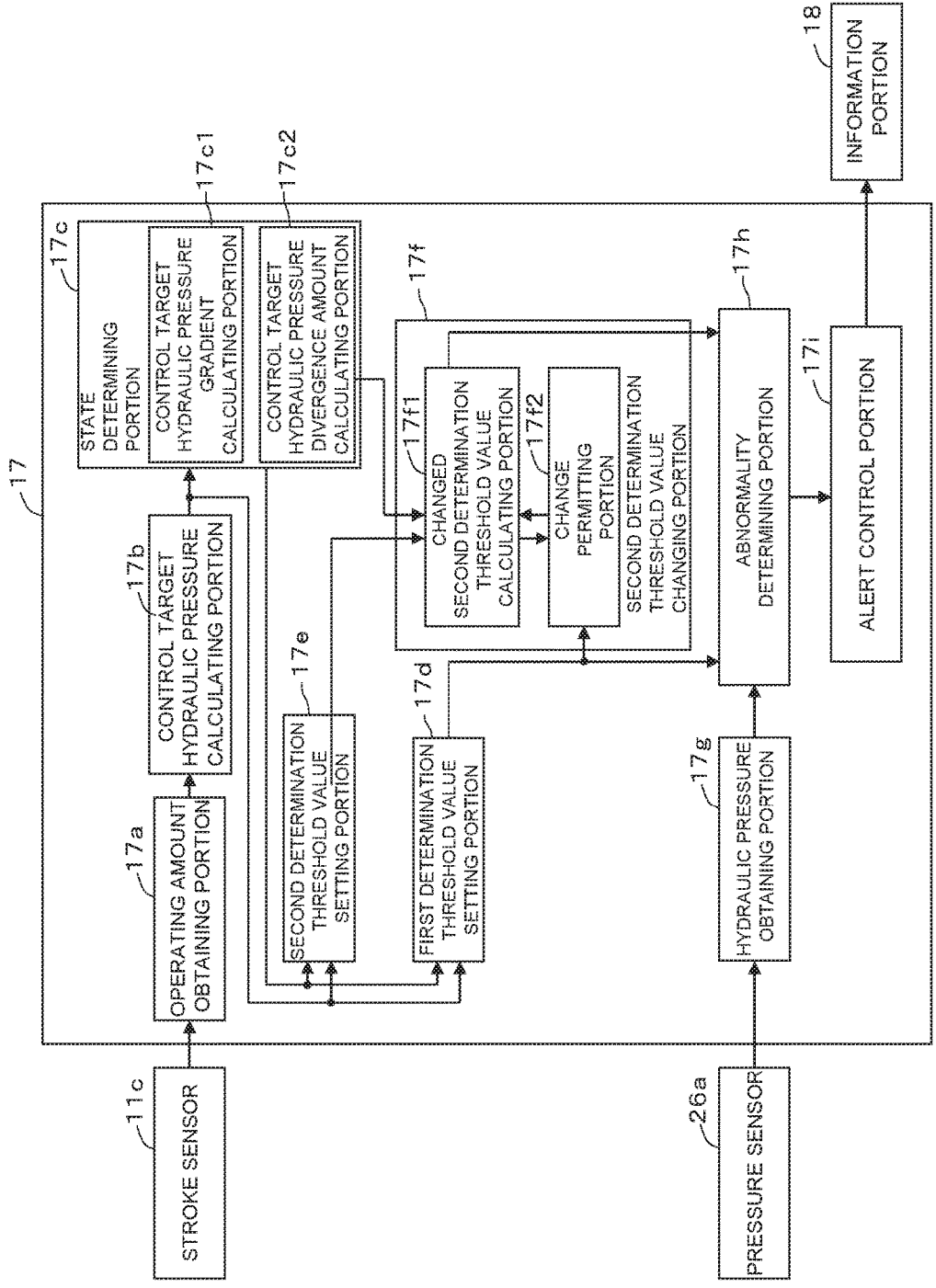
FIG. 2 is a block diagram of a brake ECU illustrated in FIG. 1.

Referring now to drawings, an embodiment of an abnormality detection device according to the present invention applied to a vehicle will be described. The vehicle is provided with a hydraulic pressure braking force generating device A configured to brake the vehicle by applying a hydraulic braking force directly to wheels Wfl, Wfr, Wrl, and Wrr. As illustrated in FIG. 1, the hydraulic pressure braking force generating device A includes a brake pedal 11 which is a braking operation member, a master cylinder 12, a stroke simulator portion 13, a reservoir 14, a booster mechanism 15, an actuator (brake hydraulic pressure adjusting device) 16, a brake ECU 17 (abnormality detection device), and a wheel cylinder WC. The hydraulic pressure braking force generating device A is a brake system.

The wheel cylinder WC restricts the rotation of a vehicle wheel W and is provided at a caliper CL. The wheel cylinder WC functions as a braking force applying mechanism which applies braking force to the vehicle wheel W based on the pressure of brake fluid (braking hydraulic pressure) from the actuator 16. When the braking hydraulic pressure is applied to the wheel cylinder WC, each piston (not shown) of the wheel cylinder WC pushes a pair of brake pads (not shown) which is the friction member to sandwich and squeeze a disc rotor DR which is a rotational member rotating unitary with the vehicle wheel W at both sides of the rotor DR to thereby restrict the rotation of the rotor. In this embodiment, a disc type brake system is adopted, but a drum type brake system can be adopted. The vehicle wheel W means any of the front left wheel Wfl, front right wheel Wfr, rear left wheel Wrl and rear right wheel Wrr.

The brake pedal 11 is a brake operation member, and is connected to the stroke simulator portion 13 and the master cylinder 12 via an operating rod 11a.

Provided in the vicinity of the brake pedal 11 is a pedal stroke sensor (may be referred to as a stroke sensor, hereinafter) 11c configured to detect a brake pedal stroke (operating amount: may be referred to as a stroke, hereinafter) which is a brake operation state based on the depression of the brake pedal 11. The stroke sensor 11c is connected to the brake ECU 17, and is configured to output a detection signal (detection result) to the brake ECU 17.

The master cylinder 12 supplies the brake fluid with the actuator 16 in response to the operating amount of the brake pedal 11 (brake operating member) and is formed by a cylinder body 12a, an input piston 12b, a first master piston 12c, and a second master piston 12d, etc.

The cylinder body 12a is formed into a bottomed substantially cylindrical shape. The cylinder body 12a includes in the interior thereof a partition wall portion 12a2 having an inwardly projecting flange shape. The partition wall portion 12a2 includes a through hole 12a3 penetrating at a center thereof in a fore-and-aft direction. The cylinder body 12a houses the first master piston 12c and the second master piston 12d so as to be movable along an axial direction in a liquid-tight manner in a portion forward of the partitioning wall portion 12a2.

The cylinder body 12a houses the input piston 12b so as to be movable along the axial direction in a liquid-tight manner in a portion rearward of the partitioning wall portion 12a2. The input piston 12b is a piston sliding in the cylinder body 12a in response to an operation of the brake pedal 11.

The input piston 12b is connected to the operating rod 11a which moves in association with the movement of the brake pedal 11. The input piston 12b is biased by a compression spring 11b in a direction where the volume of a first hydraulic pressure chamber R3 is extended, i.e., in a rearward direction (right direction as vied in the drawing). When the brake pedal 11 is depressed, the operating rod 11a moves forward against the biasing force of the compression spring 11b. Along with the advancement of the operating rod 11a, the input piston 12b also advances interlockingly. Also, when the depression of the brake pedal 11 is released, the input piston 12b retreats by the biasing force of the compression spring 11b until it contacts with a restriction projecting portion 12a4 and is positioned thereby.

The first master piston 12c integrally includes a pressurizing cylindrical portion 12c1, a flange portion 12c2, and a projecting portion 12c3 arranged in this order from the front. The pressurizing cylindrical portion 12c1 is formed into a bottomed substantially cylindrical shape opening toward the front, and is disposed in the cylinder body 12a so as to be slidable with respect to an inner peripheral surface thereof in a liquid tight manner. The pressurizing cylindrical portion 12c1 includes a coil spring 12c4, which is a biasing member, disposed in an internal space thereof against the second master piston 12d. The first master piston 12c is biased rearward by the coil spring 12c4. In other words, the first master piston 12c is biased rearward by the coil spring 12c4, and finally is positioned by coming into abutment with a restriction projecting portion 12a5. This position corresponds to an original position (predetermined position) when a depressing operation of the brake pedal 11 is released.

The flange portion 12c2 is formed to have a diameter larger than that of the pressurizing cylindrical portion 12c1, and is disposed so as to be slidable with respect to an inner peripheral surface of a large diameter portion 12a6 in the cylinder body 12a in a liquid tight manner. The projecting portion 12c3 is formed to have a diameter smaller than that of the pressurizing cylindrical portion 12c1, and is disposed in the through hole 12a3 of the partition wall portion 12a2 so as to be slidable in a liquid tight manner. A rear end portion of the projecting portion 12c3 penetrates through the through hole 12a3, projects into an internal space of the cylinder body 12a, and is apart from the inner peripheral surface of the cylinder body 12a. A rear end surface of the projecting portion 12c3 is apart from a bottom surface of the input piston 12b, and the distance therebetween may vary.

The second master piston 12d is disposed forward of the first master piston 12c in the cylinder body 12a. The second master piston 12d is formed into a bottomed substantially cylindrical shape opening forward. The second master piston 12d includes a coil spring 12d1, which is a biasing member, in an internal space of the second master piston 12d against an inner bottom surface of the cylinder body 12a. The second master piston 12d is biased rearward by the coil spring 12d1. In other words, the second master piston 12d is biased by the coil spring 12d1 toward a preset original position.

The master cylinder 12 includes a first master chamber R1, a second master chamber R2, the first hydraulic pressure chamber R3, a second hydraulic pressure chamber R4, and a servo chamber (driving hydraulic pressure chamber) R5.

The first master chamber R1 is partitioned and defined by the inner peripheral surface of the cylinder body 12a, the first master piston 12c (the front side of the pressurizing cylindrical portion 12c1), and the second master piston 12d. The first master chamber R1 is connected to the reservoir 14 via a hydraulic conduit 21 connected to a port PT4. The first master chamber R1 is connected to a hydraulic passage 40a (actuator 16) via a hydraulic conduit 22 connected to a port PT5.

The second master chamber R2 is partitioned and defined by the inner peripheral surface of the cylinder body 12a and a front side of the second master piston 12d. The second master chamber R2 is connected to the reservoir 14 via a hydraulic conduit 23 connected to a port PT6. The second master chamber R2 is also connected to a hydraulic passage 50a (actuator 16) via a hydraulic conduit 24 connected to a port PT7.

The first hydraulic pressure chamber R3 is formed between the partition wall portion 12a2 and the input piston 12b, and is partitioned and defined by the inner peripheral surface of the cylinder body 12a, the partition wall portion 12a2, the projecting portion 12c3 of the first master piston 12c, and the input piston 12b. The second hydraulic pressure chamber R4 is formed laterally of the pressurizing cylindrical portion 12c1 of the first master piston 12c, and is partitioned and defined by the large diameter portion 12a6 of the inner peripheral surface of the cylinder body 12a, the pressurizing cylindrical portion 12c1, and the flange portion 12c2. The first hydraulic pressure chamber R3 is connected to the second hydraulic pressure chamber R4 via a hydraulic conduit 25 connected to the port PT1 and the port PT3.

The servo chamber R5 is formed between the partition wall portion 12a2 and the pressurizing cylindrical portion 12c1 of the first master piston 12c, and is partitioned and defined by the inner peripheral surface and the partition wall portion 12a2 of the cylinder body 12a, and the projecting portion 12c3 and the pressurizing cylindrical portion 12c1 of the first master piston 12c. The servo chamber R5 is connected to an output chamber R12 via a hydraulic conduit 26 connected to the port PT2.

A pressure sensor (braking force related physical amount sensor) 26a is a sensor configured to detect a servo pressure (driving hydraulic pressure) supplied to the servo chamber R5, that is, a hydraulic pressure (pressure), which is a physical amount relating to the braking force, and is connected to the hydraulic conduit 26. The pressure sensor 26a sends a detection signal (detection result) to the brake ECU 17.

The stroke simulator portion 13 is formed by the cylinder body 12a, the input piston 12b, the first hydraulic pressure chamber R3 and the stroke simulator 13a which is connected to the first hydraulic pressure chamber R3.

The first hydraulic pressure chamber R3 is connected to the stroke simulator 13a via the conduits 25 and 27 which are connected to the port PT1. It is noted that the first hydraulic pressure chamber R3 is connected to the reservoir 14 via a hydraulic conduit (not shown).

The stroke simulator 13a generates a magnitude of stroke (reaction force) at the brake pedal 11 corresponding to the operation state of the brake pedal 11. The stroke simulator 13a is formed by a cylindrical portion 13a1, a piston portion 13a2, a reaction force hydraulic pressure chamber 13a3 and a spring 13a4. The piston portion 13a2 liquid-tightly slidably moves in the cylindrical portion 13a1 in response to the brake operation by the brake pedal 11. The reaction force hydraulic pressure chamber 13a3 is partitioned and formed between the cylindrical portion 13a1 and the piston portion 13a2. The reaction force hydraulic pressure chamber 13a3 is connected to the first and the second hydraulic pressure chambers R3 and R4 via the hydraulic conduits 27 and 25. The spring 13a4 biases the piston portion 13a2 in a direction where the volume of the reaction force hydraulic pressure chamber 13a3 decreases.

It is noted that the hydraulic conduit 25 is provided with a first control valve 25a which is a normally closed type electromagnetic valve. A second control valve 28a which is a normally open type electromagnetic valve is provided in a hydraulic conduit 28 which connects the hydraulic conduit 25 and the reservoir 14. When the first control valve 25a is in a closed state, the communication between the first hydraulic pressure chamber R3 and the second hydraulic pressure chamber R4 are interrupted. Under such state, the input piston 12b and the first master piston 12c are moved with a predetermined distance maintained therebetween. Further, when the first control valve 25a is in an open state, the communication between the first hydraulic pressure chamber R3 and the second hydraulic pressure chamber R4 is established. Under this state, the volume change of the first hydraulic pressure chamber R3 and the second hydraulic pressure chamber R4 caused by the advance/retreat movement of the first master piston 12c can be absorbed by the transfer of the brake fluid.

The pressure sensor 25b is a sensor configured to detect a reaction force hydraulic pressure of the second hydraulic pressure chamber R4 and the first hydraulic pressure chamber R3, and is connected to the hydraulic conduit 25. The pressure sensor 25b is also an operating force sensor configured to detect an operating force with respect to the brake pedal 11, and has a relative relationship with respect to the amount of operation of the brake pedal 11. The pressure sensor 25b detects a pressure in the second hydraulic pressure chamber R4 when the first control valve 25a is in the closed state, and detects also a pressure (the reaction force hydraulic pressure) of the first hydraulic pressure chamber R3 communicating therewith when the first control valve 25a is in the opened state. The pressure sensor 25b sends a detection signal (detection result) to the brake ECU 17.

The booster mechanism 15 generates a servo pressure in accordance with the operating amount of the brake pedal 11. The booster mechanism 15 is provided with a regulator 15a and a pressure supplying device 15b.

The regulator 15a includes a cylinder body 15a1 and a spool 15a2 sliding in the cylinder body 15a1. The regulator 15a includes a pilot chamber R11, an output chamber R12, and a hydraulic pressure chamber R13.

The pilot chamber R11 is partitioned and defined by the cylinder body 15a1 and a front end surface of a second large diameter portion 15a2b of the spool 15a2. The pilot chamber R11 is connected to a pressure decreasing valve 15b6 and a pressure increasing valve 15b7 (to a hydraulic conduit 31) connected to a port PT11. An inner peripheral surface of the cylinder body 15a1 is provided with a restriction projecting portion 15a4 which is positioned by abutment with a front end surface of the second large diameter portion 15a2b of the spool 15a2.

The output chamber R12 is partitioned and defined by the cylinder body 15a1, a small diameter portion 15a2c of the spool 15a2, and a rear end surface of the second large diameter portion 15a2b, and a front end surface of a first large diameter portion 15a2a. The output chamber R12 is connected to the servo chamber R5 of the master cylinder 12 via the hydraulic conduit 26 connected to a port PT12 and the port PT2. The output chamber R12 is connectable to an accumulator 15b2 via a hydraulic conduit 32 connected to a port PT13.

The hydraulic pressure chamber R13 is partitioned and defined by the cylinder body 15a1 and a rear end surface of the first large diameter portion 15a2a of the spool 15a2. The hydraulic pressure chamber R13 is connectable to a reservoir 15b1 via a hydraulic conduit 33 connected to a port PT14. The hydraulic pressure chamber R13 houses a spring 15a3 configured to bias the hydraulic pressure chamber R13 in a direction of extension.

The spool 15a2 is formed by the first large diameter portion 15a2a, the second large diameter portion 15a2b and the small diameter portion 15a2c. The first large diameter portions 15a2a and the second large diameter portion 15a2b are formed such that they liquid-tightly slide within the cylinder body 15a1. The small diameter portion 15a2c is disposed between the first large diameter portion 15a2a and the second large diameter portion 15a2b and formed integrally therewith. The diameter of the small diameter portion 15a2c is formed to be smaller than the diameters of the first large diameter portion 15a2a and the second large diameter portion 15a2b.

A communication passage 15a5 is provided at the spool 15a2 to connect the output chamber R12 and the hydraulic pressure chamber R13.

The pressure supplying device 15b is also a drive unit configured to drive the spool 15a2. The pressure supplying device 15b includes the reservoir 15b1, which is a low-pressure source, the accumulator 15b2, which is a high-pressure source, and configured to accumulate a braking fluid, a pump 15b3 configured to suck the braking fluid of the reservoir 15b1 and pump the same toward the accumulator 15b2, and an electric motor 15b4 configured to drive the pump 15b3. The reservoir 15b1 is opened to the atmosphere, and the hydraulic pressure in the reservoir 15b1 is the same as the atmospheric pressure. The low-pressure source provides a lower pressure than that from the high-pressure source. The pressure supplying device 15b includes a pressure sensor 15b5 configured to detect the pressure of a brake fluid supplied from the accumulator 15b2 and outputs the detected pressure to the brake ECU 17.

The pressure supplying device 15b is further provided with a pressure decreasing valve 15b6 and a pressure increasing valve 15b7. The pressure decreasing valve 15b6 is an electromagnetic valve of a structure (normally-open type) opening in a non-energized state, a flow rate of which is controlled by a command from the brake ECU 17. One side of the pressure decreasing valve 15b6 is connected to the pilot chamber R11 via the hydraulic conduit 31, and the other side of the pressure decreasing valve 15b6 is connected to the reservoir 15b1 via a hydraulic conduit 34. The pressure increasing valve 15b7 is an electromagnetic valve of a structure (normally-close type) closing in the non-energized state, a flow rate of which is controlled by a command from the brake ECU 17. One side of the pressure increasing valve 15b7 is connected to the pilot chamber R11 via the hydraulic conduit 31, and the other side of the pressure increasing valve 15b7 is connected to the accumulator 15b2 via a hydraulic conduit 35 and the hydraulic conduit 32 connected to the hydraulic conduit 35.

The operation of the regulator 15a will be briefly described hereinafter. When no pilot pressure is supplied from the pressure decreasing valve 15b6 and the pressure increasing valve 15b7 to the pilot chamber R11, the spool 15a2 is biased by the spring 15a3 and is located at the original position (see FIG. 1). The original position of the spool 15a2 is a position where a front end surface of the spool 15a2 is positioned by coming into abutment with the restriction projecting portion 15a4 and a position immediately before a position where a rear end surface of the spool 15a2 closes the port PT14.

Thus, when the spool 15a2 is at the original position, the port PT14 and the port PT12 are in communication with each other via the communication passage 15a5, and the port PT13 is closed by the spool 15a2.

When the pilot pressure established by the pressure decreasing valve 15b6 and the pressure increasing valve 15b7 in accordance with the operating amount of the brake pedal 11 increases, the spool 15a2 moves rearward (rightward in FIG. 1) against a biasing force of the spring 15a3. Accordingly, the spool 15a2 is then moved to a position where the port PT13, which has been closed, opens. The port PT14, which has been opened, is closed by the spool 15a2 (Pressure increasing operation).

The spool 15a2 is positioned by a pressing force of the front end surface of the second large diameter portion 15a2b of the spool 15a2 and a force corresponding to the servo pressure well balanced to each other. The position of the spool 15a2 at this time is referred to as a maintaining position. The port PT13 and the port PT14 are closed by the spool 15a2 (Pressure maintaining operation).

When the pilot pressure established by the pressure decreasing valve 15b6 and the pressure increasing valve 15b7 in accordance with the operating amount of the brake pedal 11 decreases, the spool 15a2 at the maintaining position is moved forward by the biasing force of the spring 15a3. Then, the port PT13 closed by the spool 15a2 is maintained in the closed state. The port PT14 which has been closed are opened. At this time, the port PT14 and the port PT12 communicate with each other via the communication passage 15a5 (Pressure decreasing operation).

The booster mechanism 15 described above establishes the pilot pressure by the pressure decreasing valve 15b6 and the pressure increasing valve 15b7 in accordance with the stoke of the brake pedal 11, and generates a servo pressure in accordance with the stroke of the brake pedal 11 by the pilot pressure. The generated servo pressure is supplied to the servo chamber R5 of the master cylinder 12, and the master cylinder 12 supplies a master cylinder pressure generated in accordance with the stroke of the brake pedal 11 to the wheel cylinder WC.

The actuator 16 is a device for adjusting a braking hydraulic pressure to be applied to each wheel cylinder WC, and is provided with first and second conduit systems 40 and 50. The first conduit system 40 controls the braking hydraulic pressure applied to the rear-left wheel Wrl and the rear-right wheel Wrr, and the second conduit system 50 controls a braking hydraulic pressure applied to the front-right wheel Wfr and the front-left wheel Wfl. In other words, the configuration of conduit is fore-and-aft conduit.

The hydraulic pressure supplied from the master cylinder 12 is transmitted to each wheel cylinders WCrl, WCrr, WCfr, and WCfl through the first conduit system 40 and the second conduit system 50. The first conduit system 40 is provided with the hydraulic passage 40a which connects the wheel cylinders WCrl and WCrr and the hydraulic conduit 22. The second conduit system 50 is provided with the hydraulic passage 50a which connects the wheel cylinders WCfr, and WCfl and the hydraulic conduit 24. The hydraulic pressure from the master cylinder 12 is transmitted to each wheel cylinders WCrl, WCrr, WCfr, and WCfl through these hydraulic passages 40a and 50a, respectively.

The hydraulic passages 40a and 50a are branched off to respective two hydraulic passages 40a1, 40a2, 50a1, and 50a2, respectively. The hydraulic passages 40a1 and 50a1 are provided with first pressure increasing valves 41 and 51 which control the pressure increase of the brake hydraulic pressure to each wheel cylinders WCrl and WCfr, respectively. Another each hydraulic passage 40a2 and 50a2 is provided with second pressure increasing valves 42 and 52 which controls the pressure increase of the brake hydraulic pressure to each wheel cylinder WCrr and WCfl.

These first and second pressure increasing valves 41, 42, 51, and 52 are formed by a two positional electromagnetic valve which can control connection/disconnection state of the valve. The first and the second pressure increasing valves 41, 42, 51, and 52 are formed as a normally open type valve which becomes connected state when the control current to the solenoid coil provided in the respective valves 41, 42, 51 and 52 becomes zero (non-energized state) and becomes disconnected state when the control current flows through the solenoid coil (energized state).

The hydraulic passages 40a and 50a between the first and the second pressure increasing valves 41, 42, 51 and 52 and the wheel cylinders WCrl, WCrr, WCfr, and WCfl are connected to reservoirs 43 and 53, respectively through the portions of hydraulic passages 40*b* and 50*b* functioning as the pressure decreasing hydraulic passage. In the hydraulic passages 40*b* and 50*b*, first and second pressure decreasing valves 44, 45, 54, and 55 are respectively provided which are formed by a two positional electromagnetic valve which can control connection/disconnection state of the valve. The first and the second pressure decreasing valves 44, 45, 54, and 55 are formed as a normally closed type valve which becomes disconnected state when the control current to the solenoid coil provided in the respective valves 44, 45, 54, and 55 becomes zero (non-energized state) and becomes connected state when the control current flows through the solenoid coil (energized state).

The hydraulic passages 40*c* and 50*c* which serve as the return hydraulic passages are provided between the reservoirs 43 and 53 and the hydraulic passages 40*a* and 50*a* which are the main hydraulic passages. The hydraulic passages 40*c* and 50*c* are provided with pumps 46 and 56 configured to be driven by a motor 47, which sucks and discharges the braking fluid from the reservoirs 43 and 53 toward the master cylinder 12 or toward the wheel cylinders WCrl, WCrr, WCfr, and WCfl.

The pumps 46 and 56 suck the brake fluid from the reservoirs 43 and 53 and discharge to the hydraulic passages 40*a* and 50*a* to supply the wheel cylinders WCrl, WCrr, WCfr, and WCfl with the brake fluid.

Further, the detected signals from wheel speed sensors Sfl, Srr, Sfr, and Srl provided in each wheel Wfl, Wrr, Wfr and Wrl of the vehicle are inputted to the brake ECU 17. The brake ECU 17 calculates the wheel speed of each wheel, presumed vehicle body speed and slip ratio and so on, based on the detected signals from the wheel speed sensors Sfl, Srr, Sfr, and Srl. The brake ECU 17 executes the anti-skid control and so on, based on the calculation results.

Each control using the actuator 16 is executed at the brake ECU 17. For example, by outputting the control current which controls each type of control valves 41, 42, 44, 45, 51, 52, 54, and 55 provided in the actuator 16 and the motor 47 which drives the pumps, the brake ECU 17 controls the hydraulic pressure circuit provided in the actuator 16 to individually control the wheel cylinder pressures transmitted to the respective wheel cylinders WCrl, WCrr, WCfr, and WCfl. For example, the brake ECU 17 executes the anti-skid control which prevents wheels from locking by executing pressure decreasing, pressure maintaining and pressure increasing of the wheel cylinder pressure when a wheel slips upon braking operation or executes a stability control which allows to perform an ideal turning operation of the vehicle by suppressing the skidding tendency (under-steer or over steer tendency) by automatically increasing the wheel cylinder pressure of the control subject wheel.

The brake ECU 17 includes an operating amount obtaining portion 17*a*, a control target hydraulic pressure calculating portion (control target braking force related physical amount calculating portion) 17*b*, a state determining portion 17*c*, a first determination threshold value setting portion 17*d*, a second determination threshold value setting portion 17*e*, a second determination threshold value changing portion 17*f*, a hydraulic pressure obtaining portion (control target braking force related physical amount obtaining portion) 17*g*, an abnormality determining portion 17*h*, and an alert control portion 17*i*.

The operating amount obtaining portion 17*a* obtains the operating amount of the brake pedal 11 (the operating amount relating to the braking operation: hereinafter, may be referred to as stroke) from the stroke sensor 11*c*. The operating amount obtaining portion 17*a* may obtain an operating force detected by a sensor configured to detect an operating force (depressing force) applied directly to the brake pedal 11 instead of the operating amount of the brake pedal 11.

The control target hydraulic pressure calculating portion 17*b* obtains a stroke from the operating amount obtaining portion 17*a*, and calculates a control target hydraulic pressure in accordance with an operation state (for example, the stroke) of brake operating members or requirements from other systems (other systems). The hydraulic pressure is a physical amount relating to a braking force (braking force related physical amount), and the control target hydraulic pressure is, for example, a control target of the servo pressure. The control target hydraulic pressure may be a control target of a master cylinder pressure (in this case, it is preferable to provide a pressure sensor configured to detect the master cylinder pressure). The control target hydraulic pressure calculating portion 17*b* includes, for example, a map indicating a relating relationship between the stroke and the control target hydraulic pressure, and calculates the control target hydraulic pressure from the map.

Other systems are, for example, a pre-crash prevention system which generates a braking force automatically to prevent a crash when the vehicle detects probability of a crash. The control target hydraulic pressure calculating portion 17*b* may be configured to obtain a required braking force (or required deceleration) from other systems.

The state determining portion 17*c* performs a state determination for determining whether the control target hydraulic pressure is in a maintaining state of being maintained at a constant value, an increasing state of being increased, or a decreasing state of being decreased. More specifically, the state determining portion 17*c* includes a control target hydraulic pressure gradient calculating portion (control target braking force related physical amount gradient calculating portion) 17*c*1 and a control target hydraulic pressure divergence amount calculating portion (control target braking force related physical amount divergence amount calculating portion) 17*c*2. The control target hydraulic pressure gradient calculating portion 17*c*1 calculates a control target hydraulic pressure gradient (control target braking force related physical amount gradient), which is a gradient of the control target hydraulic pressure, from the control target hydraulic pressure calculated by the control target hydraulic pressure calculating portion 17*b*. The control target hydraulic pressure divergence amount calculating portion 17*c*2 calculates a control target hydraulic pressure divergence amount (control target braking force related physical amount divergence amount) which is a divergence amount of the hydraulic pressure obtained by the hydraulic pressure obtaining portion 17*g* after a started time when the determination that the control target hydraulic pressure is in the maintaining state is started with respect to the control target hydraulic pressure calculated by the control target hydraulic pressure calculating portion 17*b* at the started time.

The state determining portion 17*c* performs the state determination from at least one of the control target hydraulic pressure gradient calculated by the control target hydraulic pressure gradient calculating portion 17*c*1 and the control target hydraulic pressure divergence amount calculated by the control target hydraulic pressure divergence amount calculating portion 17*c*2.

When the control target hydraulic pressure gradient (an absolute value of the control target hydraulic pressure gradient) is larger than the determined gradient, the state determining portion 17*c* may perform the state determination only by the control target hydraulic pressure gradient. When the control target hydraulic pressure gradient is steep, the state determination may be performed only by the control target hydraulic pressure gradient, and thus determination in the early stage is achieved.

When the control target hydraulic pressure divergence amount is larger than the determined divergence amount, the state determining portion 17c may perform the state determination only by the control target hydraulic pressure divergence amount. When the control target hydraulic pressure gradient is gradual, reliable and adequate determination of the state is achieved by performing the state determination only by the control target hydraulic pressure divergence amount.

When the control target hydraulic pressure gradient (the absolute value of the control target hydraulic pressure gradient) is smaller than the determined gradient, the state determining portion 17c can perform the state determination by the control target hydraulic pressure gradient and together the control target hydraulic pressure divergence amount. Accordingly, reliable and accurate determination is achieved.

The first determination threshold value setting portion 17d is a threshold value setting portion configured to set a threshold value that specifies a permissible divergence range between the hydraulic pressure obtained by the hydraulic pressure obtaining portion 17g and the control target hydraulic pressure calculated by the control target hydraulic pressure calculating portion 17b. A first determination threshold value is a threshold value that specifies a permissible divergence range between the hydraulic pressure obtained by the hydraulic pressure obtaining portion 17g and the control target hydraulic pressure calculated by the control target hydraulic pressure calculating portion 17b.

When the control target hydraulic pressure is in the increasing state or the decreasing state, the first determination threshold value setting portion 17d sets the first determination threshold value by adding or subtracting a first predetermined value to or from the control target hydraulic pressure. When it is in the increasing state, the first determination threshold value is calculated by subtracting the first predetermined value from the control target hydraulic pressure. When it is in the decreasing state, the first determination threshold value is calculated by adding the first predetermined value to the control target hydraulic pressure.

When the control target hydraulic pressure is in the maintaining state, the first determination threshold value setting portion 17d set the control target hydraulic pressure as the first determination threshold value.

The second determination threshold value setting portion 17e is a threshold value setting portion configured to set a threshold value that specifies a permissible divergence range between the hydraulic pressure obtained by the hydraulic pressure obtaining portion 17g and the control target hydraulic pressure calculated by the control target hydraulic pressure calculating portion 17b. A second determination threshold value is a threshold value that specifies a permissible divergence range between the hydraulic pressure obtained by the hydraulic pressure obtaining portion 17g and the control target hydraulic pressure calculated by the control target hydraulic pressure calculating portion 17b.

The second determination threshold value setting portion 17e sets the second determination threshold value (preset second determination threshold value) by adding or subtracting the second predetermined value to or from the control target hydraulic pressure calculated by the control target hydraulic pressure calculating portion 17b irrespective of the state being determined by the state determining portion 17c. The second predetermined value is set to a value smaller than the first predetermined value. In other words, the second determination threshold value (the preset second determination threshold value) is smaller than the first determination threshold value. It is because variations in hydraulic pressure in the increasing state or the decreasing state are larger than variations in hydraulic pressure in the maintaining state.

When the state determining portion 17c determines that the control target hydraulic pressure is in the maintaining state, the second determination threshold value changing portion 17f increases the second determination threshold value (threshold value) at the beginning of the maintaining state, and then changes the second determination threshold value in a stepwise manner to be closer to the control target hydraulic pressure calculated by the control target hydraulic pressure calculating portion 17b (threshold value changing portion).

The second determination threshold value changing portion 17f includes a changed second determination threshold value calculating portion 17f1 and a change permitting portion 17f2.

The changed second determination threshold value calculating portion 17f1 calculates a changed second determination threshold value with respect to the preset second determination threshold value as a reference. At the beginning, the changed second determination threshold value calculating portion 17f1 calculates an initial value of the changed second determination threshold value, which is the changed second determination threshold value at a time when the maintaining state is started (at a time when the determination that the control target hydraulic pressure is in the maintaining state is started). The initial value of the changed second determination threshold value is set by adding or subtracting a third predetermined value, which is larger than the second predetermined value and smaller than the first predetermined value to or from the control target hydraulic pressure. In other words, the changed second determination threshold value is a value diverged from the control target hydraulic pressure compared with the preset second determination threshold value. The initial value of the changed second determination threshold value is a value diverged from the control target hydraulic pressure by the third predetermined value. When the state transfers from the increasing state to the maintaining state, the initial value of the changed second determination threshold value is smaller than the control target hydraulic pressure by the third predetermined value. In contrast, when the state transfers from the decreasing state to the maintaining state, the initial value of the changed second determination threshold value is a value larger than the control target hydraulic pressure by the third predetermined value.

The changed second determination threshold value calculating portion 17f1 (the second determination threshold value changing portion 17f) may set a value obtained by adding a predetermined value to the hydraulic pressure obtained by the hydraulic pressure obtaining portion 17g at the time point when the determination of the control target hydraulic pressure to be in the maintaining state is started as the initial value of the changed second determination threshold value (the threshold value).

Subsequently, the changed second determination threshold value calculating portion 17f1 calculates a value of the changed second determination threshold value in the present time by subtracting or adding a predetermined change amount to or from a previous value of the changed second determination threshold value. Accordingly, the changed second determination threshold value is changed to be closer to the control target hydraulic pressure in a stepwise manner by the change amount at every control cycle. When the state is transferred from the increasing state to the maintaining state, the changed second determination threshold value in the present time is calculated by adding the predetermined change amount to the previous changed second determination threshold value. In contrast, when the state is transferred from the decreasing state to the maintaining state, the changed second determination threshold value in the present time is calculated by subtracting the predetermined change amount from the previous changed second determination threshold value.

The change amount of the second determination threshold value to be changed by the second determination threshold value changing portion 17f is determined by considering the viscosity of an operating fluid (may be estimated based on an actually measured temperature or an estimated temperature of the operating fluid) and the variations in a hydraulic pressure control system which constitutes the hydraulic pressure braking force generating device A.

This change continues until the changed second determination threshold value becomes equal to the preset second determination threshold value set by the second determination threshold value setting portion 17e or until the state is switched from the maintaining state to the decreasing state or to the increasing state.

When the divergence amount of the second determination threshold value (threshold value) from the control target hydraulic pressure at the time when the determination that the control target hydraulic pressure is the maintaining state is started is larger than the divergence amount of the first determination threshold value (threshold value) from the control target hydraulic pressure before the time when the determination that the control target hydraulic pressure is the maintaining state is started, the change permitting portion 17f2 permits a change of the second determination threshold value by the second determination threshold value changing portion 17f. In other words, the change permitting portion 17f2 prohibits the change of the second determination threshold value by the second determination threshold value changing portion 17f when the initial value of the changed second determination threshold value immediate after the switching is smaller than the first determination threshold value immediately before being switched (when the divergence amount with respect to the control target hydraulic pressure is large). Accordingly, an unnecessary broadening of the determination threshold value when the state is switched from the increasing state or the decreasing state to the maintaining state can be avoided and hence an erroneous determination such as determining a state as abnormal that should be determined as normal can be avoided.

When the change of the second determination threshold value by the second determination threshold value changing portion 17f is not permitted (prohibited), the preset second determination threshold value is used as the second determination threshold value.

The hydraulic pressure obtaining portion 17g obtains a servo pressure having a relative relationship with the operating amount of the brake pedal 11 (the braking operation member) from the pressure sensor 26a. The hydraulic pressure obtaining portion 17g obtains a hydraulic pressure of the operating fluid controlled to become the control target hydraulic pressure calculated by the control target hydraulic pressure calculating portion 17b from the pressure sensor 26a.

The hydraulic pressure obtaining portion 17g may obtain a master cylinder pressure detected by a sensor configured to detect a master cylinder pressure generated in the master cylinder 12 instead of the servo pressure.

The abnormality determining portion 17h determines the hydraulic pressure braking force generating device A to be abnormal when the hydraulic pressure obtained by the hydraulic pressure obtaining portion 17g is deviated from the permissible divergence range.

The abnormality determining portion 17h determines abnormalities of the hydraulic pressure braking force generating device A by determining whether the hydraulic pressure obtained by the hydraulic pressure obtaining portion 17g is deviated from the permissible divergence range specified by the changed second determination threshold value changed by the second determination threshold value changing portion 17f or not, when the control target hydraulic pressure is determined to be in the maintaining state by the state determining portion 17c.

Abnormalities of the hydraulic pressure braking force generating device A include leakage of an operating fluid from any portion, abnormal opening and closing of an electromagnetic control valve (abnormal energization, abnormalities of the electromagnetic valve itself), abnormalities of the pressure sensor 26a.

Specifically, when the state is transferred from the increasing state to the maintaining state, the abnormality determining portion 17h adopts a smaller one of the first determination threshold value and the preset second determination threshold value or the changed second determination threshold value (the one diverged more than the control target hydraulic pressure) as a determination threshold value. When the state is transferred from the decreasing state to the maintaining state, the larger one of the first determination threshold value and the second determination threshold value is adopted as the determination threshold value. It is because the controlled hydraulic pressure (for example, the servo pressure) has a response delay with respect to the target control hydraulic pressure (stroke).

When the hydraulic pressure measured value is larger than the determination threshold value, the abnormality determining portion 17h determines that the hydraulic pressure system of the hydraulic pressure braking force generating device A is normal. In contrast, when the state in which the hydraulic pressure measured value is smaller than the determination threshold value continues for a predetermined period, the abnormality determining portion 17h determines that the hydraulic pressure system of the hydraulic pressure braking force generating device A is abnormal.

When the abnormality is determined by the abnormality determining portion 17h, the alert control portion 17i gives an information portion 18 an instruction to inform the abnormality of the brake system. The information portion 18 includes a display, a speaker, and the like, and displays and announces an abnormality of brake system in accordance with the information instruction.

Figure 3:
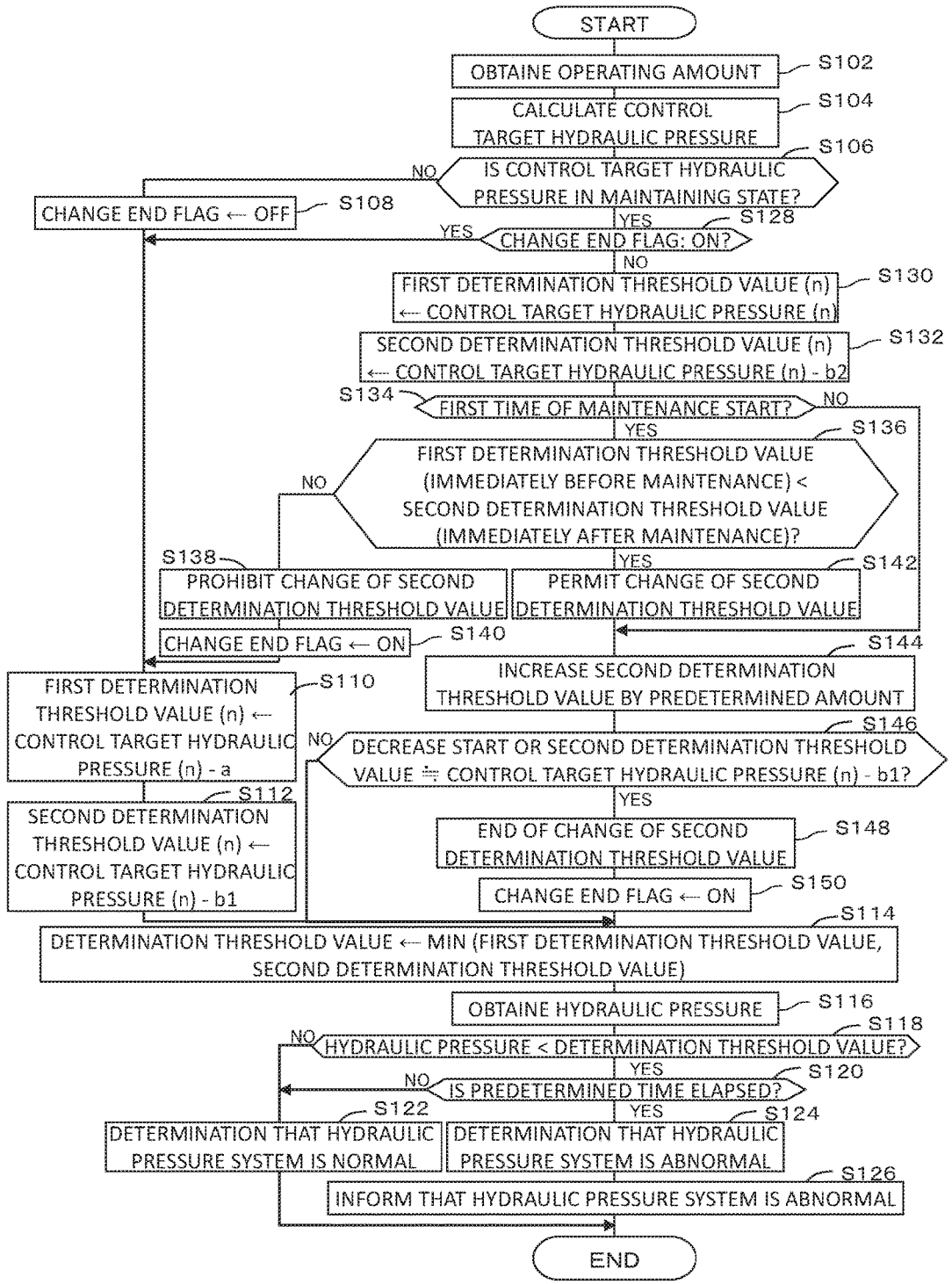
FIG. 3 is a flowchart of a control program (a control target hydraulic pressure is transferred from an increasing state to a maintaining state) to be executed by the brake ECU illustrated in FIG. 1.

In addition, the above-described operation performed by the brake system (when the state is transferred from the increasing state to the maintaining state) will be described in accordance with a flowchart illustrated in FIG. 3. The brake ECU 17 executes a program in accordance with the flowchart at every predetermined short period.

The brake ECU 17 obtains the operating amount of the brake pedal 11 from the stroke sensor 11c in Step S102. Step S102 is a step corresponding to the operating amount obtaining portion 17a as above-described.

The brake ECU 17 calculates the control target hydraulic pressure in accordance with the operating amount (stroke) in Step S104. Step S104 is a step corresponding to the control target hydraulic pressure calculating portion 17b as above-described.

The brake ECU 17 performs the state determination for determining whether the control target hydraulic pressure is in the maintaining state of being maintained at a constant value, an increasing state of being increased, or a decreasing state of being decreased in Step S106. Step S106 is a step corresponding to the state determining portion 17c as above-described.

When the control target hydraulic pressure is not in the maintaining state (When the control target hydraulic pressure is in the increasing state or in the decreasing state), the brake ECU 17 sets a first determination threshold value (n) in the present time to a value obtained by subtracting a first predetermined value "a" from a control target hydraulic pressure (n) calculated in the present time in Step S110. Step S110 is a step corresponding to the first determination threshold value setting portion 17d as above-described. The brake ECU 17 sets a second determination threshold value (n) in the present time to a value obtained by subtracting a second predetermined value "b1" from the control target hydraulic pressure (n) calculated in the present time in Step S112. Step S112 is a step corresponding to the second determination threshold value setting portion 17e as above-described.

The brake ECU 17 sets a change end flag "F" OFF in Step S108.

The brake ECU 17 adopts a smaller one of the first determination threshold value (n) and the second determination threshold value (n) which are set previously as the determination threshold value in Step S114. Step S114 is a step corresponding to the abnormality determining portion 17h as above-described. As the controlled hydraulic pressure (for example, the servo pressure) has a response delay with respect to the target control hydraulic pressure (stroke), when the state is transferred from the maintaining state to the decreasing state, a larger one of the first determination threshold value (n) and the second determination threshold value (n) which are set previously is adopted as the determination threshold value.

The brake ECU 17 obtains the servo pressure (measured value) as the hydraulic pressure (measured value) in Step S116. Step S116 is a step corresponding to the hydraulic pressure obtaining portion 17g as above-described.

The brake ECU 17 determines abnormalities of the hydraulic pressure braking force generating device A in the process from Step S118 to Step S124. This process is a process corresponding to the abnormality determining portion 17h as above-described. When the hydraulic pressure measured value is larger than the determination threshold value, the brake ECU 17 determines that the hydraulic pressure system of the hydraulic pressure braking force generating device A is normal (Step S122). In contrast, when the state in which the hydraulic pressure measured value is smaller than the determination threshold value continues for a predetermined period, the brake ECU 17 determines that the hydraulic pressure system of the hydraulic pressure braking force generating device A is abnormal (Step S124).

When it is determined that the hydraulic pressure system is abnormal, the brake ECU 17 makes the information portion 18 inform that the brake system is abnormal in Step S126. Step S126 is a step corresponding to the alert control portion 17i as above-described.

When the change end flag F is "ON", that is, when if the control target hydraulic pressure is in the maintaining state but the change of the second determination threshold value is finished or not necessary, the brake ECU 17 does not change the second determination threshold value in Step S128. At this time, the brake ECU 17 proceeds the program to Step S110 and thereafter, sets the first determination threshold value and the second determination threshold value in the same manner as described above, sets the determination threshold value, and determines whether the hydraulic pressure system is normal or abnormal.

It is note that the change end flag "F" is a flag indicating whether the changing process on the second determination threshold value is terminated or not (necessary or not). The change end flag "F" indicates that the changing process is terminated (the changing process is not necessary) when the change end flag "F" is "ON", and that the changing process is being performed (the changing process is necessary) when the change end flag "F" is "OFF".

When the control target hydraulic pressure is in the maintaining state, the brake ECU 17 sets the first determination threshold value (n) in the present time to the control target hydraulic pressure (n) calculated in the present time in Step S130. Step S130 is a step corresponding to the first determination threshold value setting portion 17d as above-described. The brake ECU 17 sets the second determination threshold value (n) in the present time to a value obtained by subtracting a third predetermined value "b2" from the control target hydraulic pressure (n) calculated in the present time in Step S132. Step S132 is a step corresponding to the changed second determination threshold value calculating portion 17f1 as above-described. The third predetermined value "b2" is preferably set to a value larger than the second predetermined value "b1" and smaller than the first predetermined value "a".

In addition, in the process from Step S134 to Step S142, when the control target hydraulic pressure is switched from the increasing state or the decreasing state to the maintaining state and the initial value of the second determination threshold value (the changed second determination threshold value) immediately after switching is larger than the first determination threshold value immediately before switching (when the divergence amount from the control target hydraulic pressure is small, it is determined that "YES" in Step S136), the brake ECU 17 permits changing of the second determination threshold value after the beginning of the maintaining state (Step S142). This process is a process corresponding to the change permitting portion 17f2 as above-described. The brake ECU 17 then proceeds the program to Step S144.

In contrast, when the initial value of the changed second determination threshold value immediately after switching is smaller than the first determination threshold value immediately before switching (when the divergence amount from the control target hydraulic pressure is large, it is determined that "NO" in Step S136), the brake ECU 17 prohibits changing of the second determination threshold value after the beginning of the maintaining state (Step S138). The brake ECU 17 sets the change end flag F "ON" in Step S140 and proceeds the program to Step S110 and thereafter.

The brake ECU 17 calculates the present second determination threshold value (changed second determination threshold value) (n) by adding a predetermined change amount to the last second determination threshold value (changed second determination threshold value) (n−1) in Step S144. Step S144 is a step corresponding to the changed second determination threshold value calculating portion 17f1 as above-described. Accordingly, the second determination threshold value (changed second determination threshold value) can be changed to be closer to the control target hydraulic pressure in a stepwise manner at every control cycle.

The brake ECU 17 continues the changing process of the second determination threshold value until the changed second determination threshold value (n) in the present time becomes equal to the preset second determination threshold value the control target hydraulic pressure (n) in the present time–the second predetermined value "b1") or until the state is switched from the maintaining state to the decreasing state (it is determined that "NO" in Step S146). This process is a process corresponding to the second determination threshold value changing portion 17f as above-described. The brake ECU 17 then proceeds the program to Step S114 and thereafter.

In contrast, the brake ECU 17 terminates the changing process of the second determination threshold value (Step S148) when the changed second determination threshold value (n) in the present time becomes equal to the preset second determination threshold value (the control target hydraulic pressure (n) in the present time–the second predetermined value "b1") or when the state is switched from the maintaining state to the decreasing state (it is determined that "YES" in Step S146). This process is a process corresponding to the second determination threshold value changing portion 17f as above-described. The brake ECU 17 sets the change end flag F "ON" in Step S150. The brake ECU 17 then proceeds the program to Step S114 and thereafter.

Figure 4:
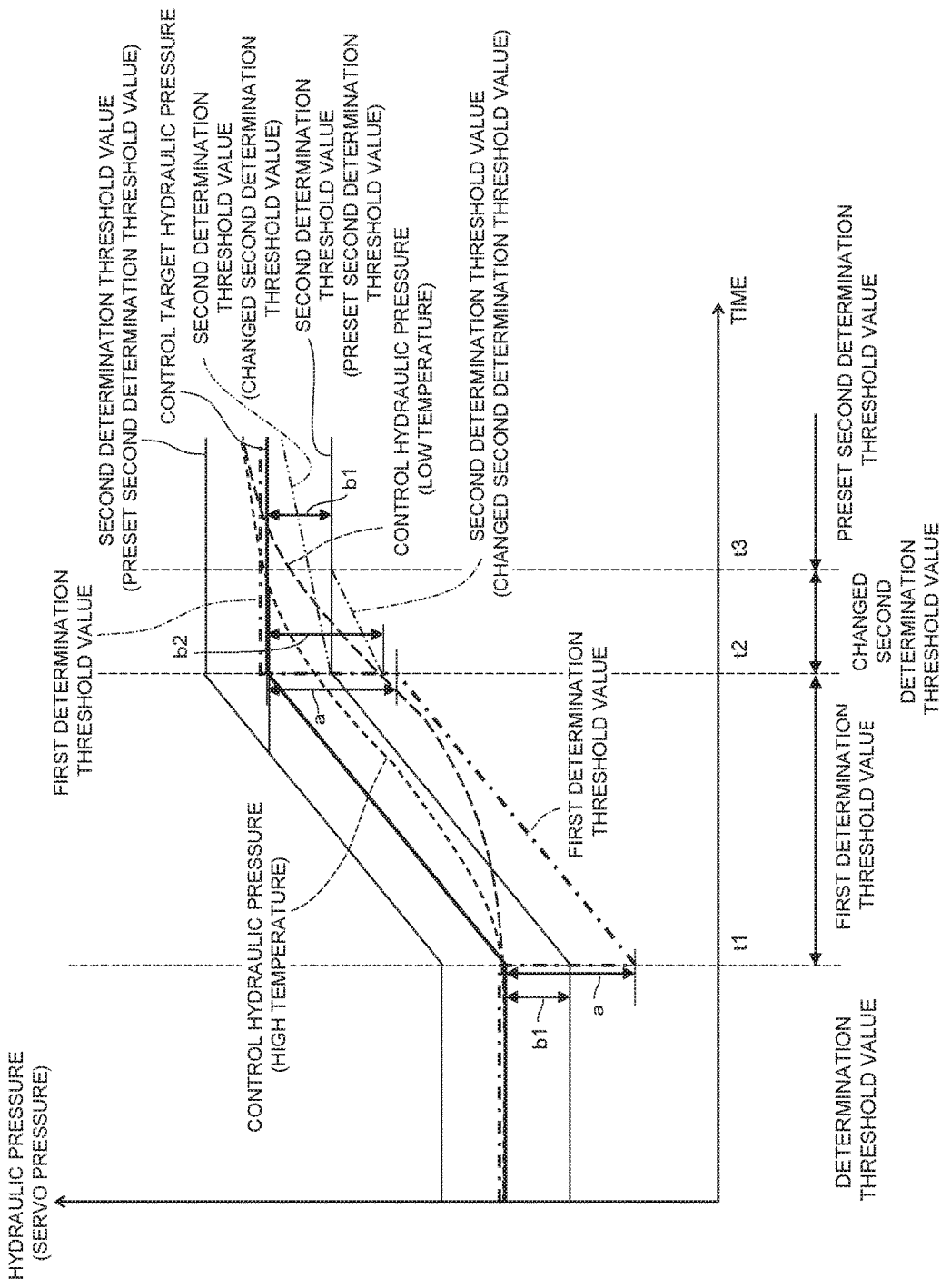
FIG. 4 is a time chart illustrating an operation (the control target hydraulic pressure is transferred from the increasing state to the maintaining state) of the abnormality detection device according to the embodiment.

In addition, the above-described operation performed by the brake system (when the state is transferred from the increasing state to the maintaining state) will be described in accordance with a time chart illustrated in FIG. 4.

A case where the control target hydraulic pressure is in the increasing state (that is, when the stroke is in the increasing state) (a period from time t1 to time t2) will be described. The time t1 is a time when the increasing state is started, and the time t2 is a time when the maintaining state is started (that is, a time point when the state is switched from the increasing state to the maintaining state).

During the period from the time t1 to the time t2, the first determination threshold value is set to a value smaller than the control target hydraulic pressure (indicated by a thick solid line) by the first predetermined value "a" as indicated by a thick dot-and-dash line. The second determination threshold value is set to a value smaller than the control target hydraulic pressure (indicated by the thick solid line) by a second predetermined value "b1" as indicated by the thin solid line. Therefore, the determination threshold value is set to the first determination threshold value.

During the period from the time t2 to time t3, the first determination threshold value is set to the control target hydraulic pressure as indicated by the thick dot-and-dash line. In FIG. 4, the first determination threshold value is indicated slightly apart from the control target hydraulic pressure for easy discrimination from the control target hydraulic pressure. The second determination threshold value (preset second determination threshold value) can be basically set to a value smaller than the control target hydraulic pressure (indicated by the thick solid line) by the second predetermined value b1 as indicated by the thin solid line.

When the change of the second determination threshold value is permitted, the second determination threshold value (the changed second determination threshold value) is set such that the preset second determination threshold value is set as an initial value at the time point when the maintaining state is started as indicated by a thin dashed-two dotted line. The initial value is set to a value smaller than the control target hydraulic pressure (indicated by the thick solid line) by the second predetermined value "b1". After the time point when the maintaining state is started, the changed second determination threshold value is set to increase from the initial value by a predetermined change amount. In this manner, when the control target hydraulic pressure is determined to be in the maintaining state, the changed second determination threshold value (threshold value) that defines the permissible divergence range for determining the abnormality of the brake system is changed to be closer to the control target hydraulic pressure in a stepwise manner. Consequently, the permissible divergence range may be set to an adequate value. Therefore, a reduction of time required for determination and improved adequacy of determination are achieved.

In addition, as another example, when the change of the second determination threshold value is permitted, the second determination threshold value (the changed second determination threshold value) is set such that the changed second determination threshold value is set as an initial value at the time point when the maintaining state is started as indicated by a thin dot-and-dash line. The initial value is set to be a value smaller than the control target hydraulic pressure by the third predetermined value "b2". During a period from the time point when the maintaining state is started until the time point when the change terminates (time t3), the changed second determination threshold value is set to increase from the initial value by a predetermined change amount. Therefore, the determination threshold value is set to the changed second determination threshold value. In other word, the determination threshold value can be extended with respect to the control target hydraulic pressure as compared with the case of the preset second determination threshold value.

When the change of the second determination threshold value is permitted, it is preferable to further delay the time point when the change terminates (time t3) to set the changed second determination threshold value to be closer to the control target hydraulic pressure in a stepwise manner.

In this manner, at the beginning of the timing when the control target hydraulic pressure is switched to the maintaining state, a normal detection range of the brake system can be widened by broadening the determination threshold value with respect to the control target hydraulic pressure by the changed second determination threshold value. As a result, for example, when the temperature of the operating fluid is low, the responsiveness of the operating fluid is delayed, and accordingly, the hydraulic pressure of the operating fluid (controlled hydraulic pressure; indicated by a long dash line) is without the normal detection range specified by the preset second determination threshold value, and even when the brake system is erroneously determined to be abnormal, the hydraulic pressure of the operating fluid can be kept within the widened normal detection range. Therefore, even though the brake system itself is normal, an erroneous determination that the brake system is abnormal can be suppressed, for example, when the temperature of the operating fluid is low.

It is note that when the temperature of the operating fluid is high, since the responsiveness of the operating fluid is not delayed, the hydraulic pressure of the operating fluid (controlled hydraulic pressure; indicated by a short dot broken line) is within the normal detection range specified by the preset second determination threshold value, and the brake system is determined to be normal. Therefore, the brake system is not erroneously determined to be abnormal.

In the maintaining state after the time t3, the first determination threshold value is set to the control target hydraulic pressure as indicated by a thick dot-and-dash line. The second determination threshold value (preset second determination threshold value) is set to a value smaller than the control target hydraulic pressure (indicated by the thick solid line) by the second predetermined value "b1" as indicated by the thin solid line.

Figure 5:
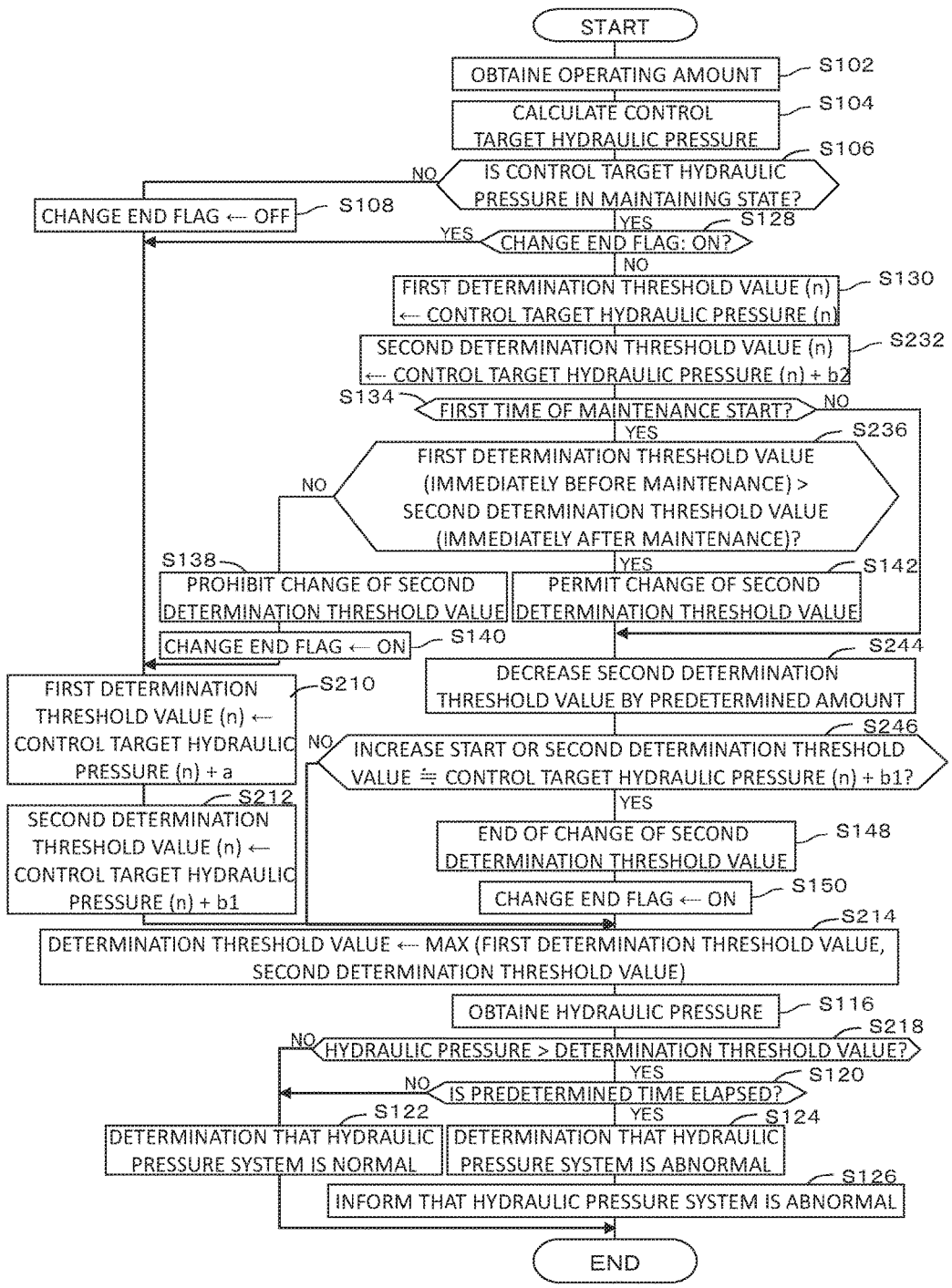
FIG. 5 is a flowchart of a control program (the control target hydraulic pressure is transferred from a decreasing state to the maintaining state) to be executed by the brake ECU illustrated in FIG. 1.

In addition, the above-described operation performed by the brake system (when the state is transferred from the decreasing state to the maintaining state) will be described in accordance with a flowchart in FIG. 5 and a time chart in FIG. 6. The flowchart will be described only on different points and the same points are denoted by the same reference signs to omit the description.

In Step S210, the brake ECU 17 sets the first determination threshold value (n) in the present time to a value obtained by adding the first predetermined value a to the control target hydraulic pressure (n) calculated in the present time. In Step S212, the brake ECU 17 sets the second determination threshold value (n) in the present time to a value obtained by adding the second predetermined value b1 to the control target hydraulic pressure (n) calculated in the present time. In Step S232, the brake ECU 17 sets the second determination threshold value (n) in the present time to a value obtained by adding the third predetermined value b2 to the control target hydraulic pressure (n) calculated in the present time.

When the initial value of the second determination threshold value (changed second determination threshold value) immediately after switching is smaller than the first determination threshold value immediately before switching (when the divergence amount from the control target hydraulic pressure is small, it is determined to be "YES" in Step S236), the brake ECU 17 permits changing of the second determination threshold value after the beginning of the maintaining state (Step S142). In contrast, when the initial value of the changed second determination threshold value immediately after switching is larger than the first determination threshold value immediately before switching (when the divergence amount from the control target hydraulic pressure is large, it is determined to be "NO" in Step S236), the brake ECU 17 prohibits changing of the second determination threshold value after the beginning of the maintaining state (Step S138).

In Step S244, the brake ECU 17 calculates the second determination threshold value in the present time (changed second determination threshold value) (n) by subtracting a predetermined change amount from the second determination threshold value in the last time (changed second determination threshold value) (n−1).

The brake ECU 17 continues the changing process of the second determination threshold value until the changed second determination threshold value (n) in the present time becomes equal to the preset second determination threshold value the control target hydraulic pressure in the present time (n)+the second predetermined value "b1") or until the state is switched from the maintaining state to the increasing state (it is determined to be "NO" in Step S246). In contrast, the brake ECU 17 terminates the changing process of the second determination threshold value when the changed second determination threshold value in the present time (n) becomes equal to the preset second determination threshold value or when the state is switched from the maintaining state to the increasing state (it is determined to be "YES" in Step S246).

The brake ECU 17 adopts a larger one of the first determination threshold value (n) and the second determination threshold value (n) which are set previously as the determination threshold value in Step S214.

When the hydraulic pressure measured value is smaller than the determination threshold value (it is determined to be "NO" in Step S218), the brake ECU 17 determines that the hydraulic pressure system of the hydraulic pressure braking force generating device A is normal (Step S122). In contrast, when the state in which the hydraulic pressure measured value is larger than the determination threshold value continues for a predetermined period (it is determined to be "Yes" in Step S218, 120, respectively), the brake ECU 17 determines that the hydraulic pressure system of the hydraulic pressure braking force generating device A is abnormal (Step S124).

A case where the control target hydraulic pressure is in the decreasing state (that is, when the stroke is in the decreasing state) (during a period from time t11 to time t12) will be described with reference to the time chart in FIG. 6. The time t11 indicates the time when the decreasing state starts, and the time t12 indicates the time when the maintaining state starts (that is, a time point when the state is switched from the decreasing state to the maintaining state).

During the period from the time t11 to the time t12, the first determination threshold value is set to a value larger than the control target hydraulic pressure (indicated by a thick solid line) by the first predetermined value "a" as indicated by a thick dot-and-dash line. The second determination threshold value is set to a value larger than the control target hydraulic pressure (indicated by the thick solid line) by the second predetermined value "b1" as indicated by a thin solid line. Therefore, the determination threshold value is set to the first determination threshold value.

During the period from the time t12 to time t13, the first determination threshold value is set to the control target hydraulic pressure as indicated by a thick dot-and-dash line. In FIG. 6, the first determination threshold value is indicated slightly apart from the control target hydraulic pressure for easy discrimination from the control target hydraulic pressure. The second determination threshold value (preset second determination threshold value) can be basically set to a value larger than the control target hydraulic pressure (indicated by the thick solid line) by the second predetermined value "b1" as indicated by the thin solid line.

When the change of the second determination threshold value is permitted, the second determination threshold value (the changed second determination threshold value) is set such that the preset second determination threshold value at the time point when the maintaining state is started is set as an initial value as indicated by a thin dashed-two dotted line. The initial value is set to a value larger than the control target hydraulic pressure (indicated by the thick solid line) by the second predetermined value "b1". After the time point when the maintaining state is started, the changed second determination threshold value is set to decrease from the initial value by a predetermined change amount. In this manner, when the control target hydraulic pressure is determined to be in the maintaining state, the changed second determination threshold value (threshold value) that defines the permissible divergence range for determining the abnormality of the brake system is changed to be closer to the control target hydraulic pressure in a stepwise manner. Consequently, the permissible divergence range may be set to an adequate value. Therefore, a reduction of time required for determination and improved adequacy of determination are achieved.

In addition, as another example, when the change of the second determination threshold value is permitted, the second determination threshold value (the changed second determination threshold value) is set such that the changed second determination threshold value at the time point when the maintaining state is started is set as an initial value as indicated by a thin dot-and-dash line. The initial value is set to be a value larger than the control target hydraulic pressure by the third predetermined value "b2". During a period from the time point when the maintaining state is started until the time point when the change terminates (time t13), the changed second determination threshold value is set to decrease from the initial value by a predetermined change amount. Therefore, the determination threshold value is set to the changed second determination threshold value. In other word, the determination threshold value can be extended with respect to the control target hydraulic pressure as compared with the case of the preset second determination threshold value.

When the change of the second determination threshold value is permitted, it is preferable to further delay the time point when the change terminates (time t13) to set the changed second determination threshold value to be closer to the control target hydraulic pressure in a stepwise manner.

In this manner, at the beginning of the timing when the control target hydraulic pressure is switched to the maintaining state, a normal detection range of the brake system can be widened by broadening the determination threshold value with respect to the control target hydraulic pressure by the changed second determination threshold value. As a result, for example, when the temperature of the operating fluid is low, the responsiveness of the operating fluid is delayed, and accordingly, the hydraulic pressure of the operating fluid (controlled hydraulic pressure; indicated by a long dash line) falls outside the normal detection range specified by the preset second determination threshold value, and even when the brake system is erroneously determined to be abnormal, the hydraulic pressure of the operating fluid can be kept within the widened normal detection range. Therefore, even though the brake system itself is normal, an erroneous determination that the brake system is abnormal can be suppressed, for example, when the temperature of the operating fluid is low.

It is note that when the temperature of the operating fluid is high, the responsiveness of the operating fluid is not delayed, the hydraulic pressure of the operating fluid (controlled hydraulic pressure; indicated by a short dot broken line) is within the normal detection range specified by the preset second determination threshold value, and the brake system is determined to be normal. Therefore, the brake system is not erroneously determined to be abnormal.

In the maintaining state after the time t13, the first determination threshold value is set to the control target hydraulic pressure as indicated by a thick dot-and-dash line. The second determination threshold value (preset second determination threshold value) is set to a value larger than the control target hydraulic pressure (indicated by the thick solid line) by the second predetermined value "b1" as indicated by the thin solid line.

As is apparent from the description descried above, the brake ECU 17 (abnormality detection device) of the embodiment is the abnormality detection device configured to detect an abnormality of the hydraulic pressure braking force generating device A (brake system), including: the control target hydraulic pressure calculating portion 17b configured to calculate the control target hydraulic pressure in accordance with the operation state of the brake pedal 11 (brake operating member) or the requirement from other system; the hydraulic pressure obtaining portion 17g configured to obtain the hydraulic pressure of the operating fluid controlled to become the control target hydraulic pressure calculated by the control target hydraulic pressure calculating portion 17b from the pressure sensor 26a; the state determining portion 17c configured to perform a state determination for determining whether the control target hydraulic pressure is in a maintaining state that the control target hydraulic pressure is maintained at a constant value, in an increasing state that the control target hydraulic pressure is increasing, or in a decreasing state that the control target hydraulic pressure is decreasing; the first and second determination threshold value setting portions 17d, 17e (threshold value setting portion) configured to set the threshold value that specifies the permissible divergence range between the hydraulic pressure obtained by the hydraulic pressure obtaining portion 17g and the control target hydraulic pressure calculated by the control target hydraulic pressure calculating portion 17b; the second determination threshold value changing portion 17f (threshold value changing portion) configured to change the threshold value so as to be closer to the control target hydraulic pressure calculated by the control target hydraulic pressure calculating portion 17b in a stepwise manner when the state determining portion 17c determines that the control target hydraulic pressure is in the maintaining state; and the abnormality determining portion 17h configured to determine the abnormality of the hydraulic pressure braking force generating device A when the hydraulic pressure obtained by the hydraulic pressure obtaining portion 17g is deviated from the permissible divergence range.

In this configuration, when the control target hydraulic pressure is determined to be in the maintaining state, the threshold value that defines the permissible divergence range for determining abnormalities of the hydraulic pressure braking force generating device A is changed to be closer to the control target hydraulic pressure in a stepwise manner. Consequently, the permissible divergence range can be set to an adequate value. Therefore, a reduction of time required for determination and improved adequacy of determination are achieved.

The state determining portion 17c includes the control target hydraulic pressure gradient calculating portion 17c1 configured to calculate the control target hydraulic pressure gradient, which is a gradient of the control target hydraulic pressure, from the control target hydraulic pressure calculated by the control target hydraulic pressure calculating portion 17b; and the control target hydraulic pressure divergence amount calculating portion 17c2 configured to calculate the control target hydraulic pressure divergence amount which is a divergence amount of the hydraulic pressure obtained by the hydraulic pressure obtaining portion 17g at a time after the determination that the control target hydraulic pressure is in the maintaining state started from the control target hydraulic pressure calculated by the control target hydraulic pressure calculating portion 17b at a time when the determination that the control target hydraulic pressure is in the maintaining state started, and the state determining portion 17c performs the state determination from at least one of the control target hydraulic pressure gradient calculated by the control target hydraulic pressure gradient calculating portion 17c1 and the control target hydraulic pressure divergence amount calculated by the control target hydraulic pressure divergence amount calculating portion 17c2.

In this configuration, both of the control target hydraulic pressure gradient and the control target hydraulic pressure divergence amount can be used, and thus adequate and accurate state determination is achieved.

In addition, the second determination threshold value changing portion 17f sets a value obtained by adding a predetermined value to the hydraulic pressure obtained by the hydraulic pressure obtaining portion 17g at the time when the determination that the control target hydraulic pressure is in the maintaining state is started as an initial value of the threshold value.

In this configuration, since the initial value of the threshold value is set based on the actually detected hydraulic pressure, it is possible to improve the failure detection accuracy when the control target hydraulic pressure is in the maintaining state.

In addition, the brake ECU 17 (abnormality detection device) further includes the change permitting portion 17f2 configured to permit the change of the threshold value by the second determination threshold value changing portion 17f when the divergence amount of the threshold value from the control target hydraulic pressure at the time when the determination that the control target hydraulic pressure is in the maintaining state started is larger than a divergence amount of the threshold value from the control target hydraulic pressure at the time before the determination that the control target hydraulic pressure is in the maintaining state started.

In this configuration, it is possible to more accurately detect the abnormality of the hydraulic braking force generating device A.

In addition, the change amount of the threshold value to be changed by the second determination threshold value changing portion 17f is determined by considering viscosity of the operating fluid and the variations in the hydraulic pressure control system which constitutes the hydraulic pressure braking force generating device A.

In this configuration, it is possible to more accurately detect the abnormality of the hydraulic braking force generating device A.

Although the hydraulic pressure is exemplified as the braking force related physical amount in the description of the embodiment described above, any physical amounts (for example, braking force, stroke of the master cylinder, stroke of the caliper piston, etc.) other than the hydraulic pressure may be adopted as long as those physical amounts relate to the braking force.

The invention claimed is:

1. An abnormality detection device configured to detect an abnormality of a brake system, comprising:
a control target braking force related physical amount calculating portion configured to calculate a control target braking force related physical amount in accordance with an operation state of a brake operating member or a requirement from other system;
a braking force related physical amount obtaining portion configured to obtain a braking force related physical amount of an operating fluid controlled to become a control target braking force related physical amount calculated by the control target braking force related physical amount calculating portion from a braking force related physical amount sensor;
a state determining portion configured to perform a state determination for determining whether the control target braking force related physical amount is in a maintaining state that the control target braking force related physical amount is maintained at a constant value, in an increasing state that the control target braking force related physical amount is increasing, or in a decreasing state that the control target braking force related physical amount is decreasing;
a threshold value setting portion configured to set a threshold value that defines a permissible divergence range between the braking force related physical amount obtained by the braking force related physical amount obtaining portion and the control target braking force related physical amount calculated by the control target braking force related physical amount calculating portion;
a threshold value changing portion configured to change the threshold value so as to be closer to the control target braking force related physical amount calculated by the control target braking force related physical amount calculating portion in a stepwise manner when the state determining portion determines that the control target braking force related physical amount is in the maintaining state; and
an abnormality determining portion configured to determine the abnormality of the brake system when the braking force related physical amount obtained by the braking force related physical amount obtaining portion is deviated from the permissible divergence range.

2. The abnormality detection device according to claim 1, wherein the state determining portion comprises:
a control target braking force related physical amount gradient calculating portion configured to calculate a control target braking force related physical amount gradient which is a gradient of the control target braking force related physical amount from the control target braking force related physical amount calculated by the control target braking force related physical amount calculating portion; and
a control target braking force related physical amount divergence amount calculating portion configured to calculate the control target braking force related physical amount divergence amount which is a divergence amount of the braking force related physical amount obtained by the braking force related physical amount obtaining portion at a time after the determination that the control target braking force related physical amount is in the maintaining state started from the control target braking force related physical amount calculated by the control target braking force related physical amount calculating portion at a time when the determination that the control target braking force related physical amount is in the maintaining state started, wherein
the state determination is performed from at least one of the control target braking force related physical amount gradient calculated by the control target braking force related physical amount gradient calculating portion and the control target braking force related physical amount divergence amount calculated by the control target braking force related physical amount divergence amount calculating portion.

3. The abnormality detection device according to claim 1, wherein the threshold value changing portion sets a value obtained by adding a predetermined value to the braking force related physical amount obtained by the braking force related physical amount obtaining portion at the time when the determination that the control target braking force related physical amount is in the maintaining state started as an initial value of the threshold value.

4. The abnormality detection device according to any claim 1, further comprising: a change permitting portion configured to permit a change of the threshold value by the threshold value changing portion when the divergence amount of the threshold value from the control target braking force related physical amount at the time when the determination that the control target braking force related physical amount is in the maintaining state started is larger than a divergence amount of the threshold value from the control target braking force related physical amount at the time before the determination that the control target braking force related physical amount is in the maintaining state started.

* * * * *